Jan. 17, 1928. 1,656,776

J. B. DAVIDSON

CHAIN FASTENER

Filed April 25, 1927

J. B. Davidson, INVENTOR

BY Victor J. Evans, ATTORNEY

WITNESS:

Patented Jan. 17, 1928.

1,656,776

UNITED STATES PATENT OFFICE.

JAMES B. DAVIDSON, OF LOGAN, IOWA, ASSIGNOR OF ONE-HALF TO JOHN H. STONER, OF LOGAN, IOWA.

CHAIN FASTENER.

Application filed April 25, 1927. Serial No. 186,417.

This invention relates to a device for fastening chains or the like together, the device being more particularly designed for fastening the ends of tire chains together, the general object of the invention being to provide a male and female member having hooks at their outer ends for receiving some of the links of a chain, the male member having ratchet teeth thereon and a plunger carried by the female member for engaging the teeth to lock the two members together.

A further object of the invention is to provide means for enclosing the plunger parts to protect them from the elements and from dirt and dust.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
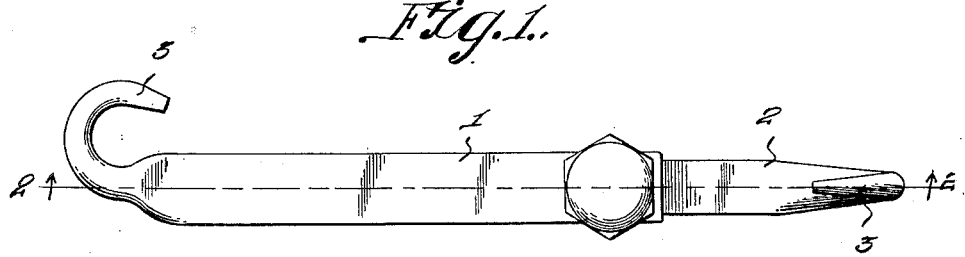
Figure 1 is an elevation of the device.
Figure 2:
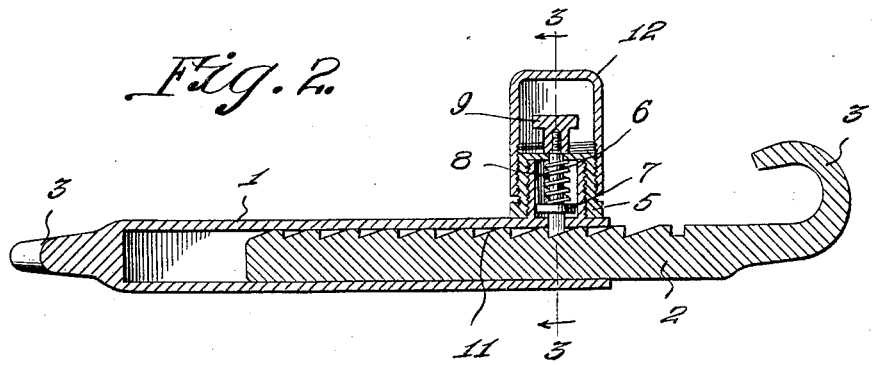
Figure 2 is a section on line 2—2 of Figure 1.
Figure 3:
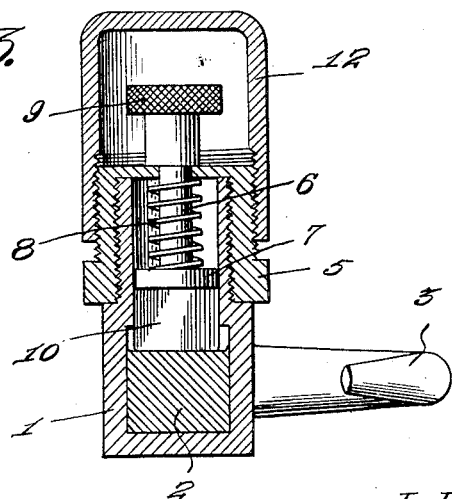
Figure 3 is a section on line 3—3 of Figure 2.

In these drawings, 1 indicates the female member and 2 indicates the male member which is adapted to be inserted in the female member. Each member is formed with a hook 3 at its outer end for receiving some of the links of the chain on which the device is used. A tubular projection 4 is formed adjacent the open end of the female member, and this projection is exteriorly screw threaded so that a cap 5 can be placed thereon. A plunger rod 6 is arranged in the projection and has its ends passing through holes formed in the cap and the bottom wall of the projection and this rod carries a disk 7 which snugly fits in the projection and acts to guide the plunger rod in its movement. A spring 8 surrounds the rod and bears against the cap and the disk and tends to hold the rod in its lowest position. A handle 9 is fastened to the upper projecting end of the rod and its lower end is of tooth-shape, as shown at 10, and is preferably of square formation to engage the square hole through which it passes.

The male member 2 is formed with ratchet teeth 11 so that when the male member is pushed into the female member, the tooth 10 on the rod will ride over the teeth 11, but said tooth 10 will prevent the member 2 from being pulled out of the member 1, as will be understood. When the two members are to be separated, the plunger rod must be retracted by pulling upon the handle 9 so as to free the tooth 10 from the teeth 11. A cap-like cover 12 is threaded on the cap 5 and encloses the handle and acts to protect the parts from dirt, dust and the elements.

From the foregoing it will be seen that I have provided a simple form of connecting means in which the member 2 can be slid into the member 1, with means for locking the parts together so that the members cannot be separated until the plunger is retracted. By having a plurality of teeth on the member 2 the parts can be adjusted to take up slack in the chain, as will be understood.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a male member having ratchet teeth thereon and a female member having a tubular projection thereon with a hole in its bottom, a plunger having a tooth-shaped inner end arranged in the projection with said inner end passing through the hole for engaging the ratchet teeth of the male member, a cap threaded on the projection and having a hole therein through which the upper end of the plunger passes, a handle on said end and a cap-like cover threaded to the cap for enclosing the parts.

In testimony whereof I affix my signature.

JAMES B. DAVIDSON.